June 4, 1946.   E. EGER   2,401,625
METHOD OF MAKING PUNCTURE SEALING MATERIAL
Filed April 13, 1940

INVENTOR.
ERNST EGER
BY Lester J. Bradley
ATTORNEY

Patented June 4, 1946

2,401,625

UNITED STATES PATENT OFFICE 2,401,625

METHOD OF MAKING PUNCTURE SEALING MATERIAL

Ernst Eger, Grosse Pointe Park, Mich., assignor to United States Rubber Company, New York, N. Y., a corporation of New Jersey Application April 13, 1940, Serial No. 329,467

3 Claims. (Cl. 154—43.5)

This invention relates to methods of making puncture sealing material and, in particular, it relates to the manufacture of a sheeting of a resilient nature and embodying compression stresses. More particularly, the invention relates to the manufacture of a sheet of rubber composition embodying compression stresses, which stresses are maintained by a substantially inextensible material forming a part of the composite sheet.

In the use of containers or tanks which operate as storage means for retaining fluids such as gasoline, it is sometimes desirable to protect the tank in the event it should become punctured by some means such as a projectile. By providing a compression layer of rubber composition adjacent to a tank wall, the compression rubber functions to close any opening which may occur in the wall due to the penetration through the wall of a puncturing object such as a projectile.

In general, my invention comprises essentially the formation of a tubular sheet formed in part of a layer of substantially inextensible material and of a layer of relatively soft rubber composition. The sheet is vulcanized in tubular form and during vulcanization the substantially inextensible material is bonded with the rubber composition. When the tubular sheet is straightened out in the form of a slab as, for example, in its application to a straight surface gasoline tank, straightening of the sheet causes the inextensible member to exert compression stresses in the rubber composition, therefore providing the puncture sealing characteristics of the sheeting.

Among the objects of my invention are to provide a puncture sealing sheet of material which may be applied to flat or curved surfaces of a tank to prevent loss of fluid notwithstanding a puncture of the tank; to provide a puncture sealing sheeting which in itself forms a unit assembly and which may be applied to various uses where puncture sealing characteristics are desired; and to provide a puncture sealing sheeting which may be manufactured efficiently and economically. These and other objects and advantages will appear more fully in the following detailed description when considered in connection with the accompanying drawing, in which:

Figure 2:
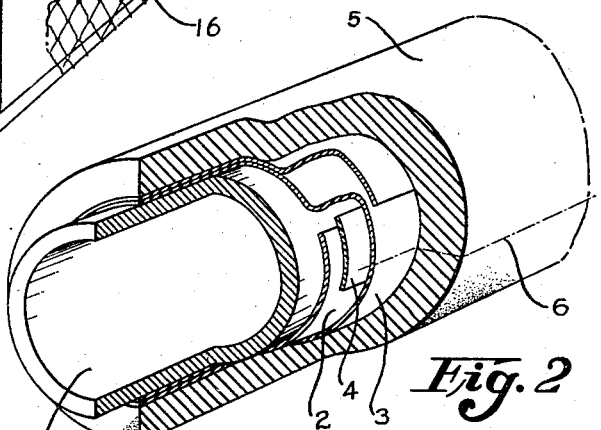
Fig. 2 is a perspective view, partly in section, of a portion of an assembly illustrating a method of manufacturing the puncture sealing material.

With reference to the drawing and, in particular, to Fig. 2, I show a method of forming a puncture sealing material which comprises the formation or assembly of materials on a tubular mandrel or pole 1. Specifically, a mandrel of this type has a diameter of approximately 3½ inches. The size of the mandrel diameter, as well as the thickness of the rubber composition, determines the amount of compression stresses which are ultimately imparted to the rubber composition of the sealing material. As appearing hereinafter, it will be obvious that the larger the diameter of the mandrel, the lesser the resultant amount of compression stresses in the sealing material. The mandrel 1 may be of any desired length suitable for convenient manufacturing purposes.

As an initial step preceding the assembly operation of the sealing material, the mandrel 1 is coated or painted with lubricating material such as soapstone for the purpose of removing rubberized materials subsequently applied thereon. Around the outer periphery of the mandrel 1 is wrapped a rubberized layer of fabric 2. A single layer of fabric 2 may be sufficient to provide the desired degree of inextensibility for supporting the sealing material. However, for the purpose of joining a plurality of sheets of the material together, I prefer to employ an additional layer or ply of fabric 3 which is assembled on top of the first ply 2. The plies 2 and 3 may be of the same strip of material, the ply 3 merely being the second convolution of the first ply 2. The fabric plies 2 and 3 may be formed of any textile material which is substantially inextensible such as square woven cotton fabric. Cord fabric may also be used, providing the cords extend substantially in opposite directions in adjacent plies, in order to provide the proper degree of inextensibility. The plies 2 and 3 are also coated with a rubber composition so as to form rubberized fabric commonly used in the tire industry.

As shown in Fig. 2, a thin strip of metal 4 extending parallel with the marginal portion of the ply 2 is assembled directly on top of the ply 2. The purpose of the strip as described hereinafter is to prevent adhesion between portions of the layers 2 and 3 and to permit the assembly to be cut for its removal from the mandrel 1. To prevent adhesion between plies 2 and 3 in in the region of the metal strip 4, it is preferable to coat the metal strip 4 or the complementary regions of the plies 2 and 3 with a lubricating material such as soapstone. After the plies have been assembled to form the equivalent of two complete convolutions, a layer of rubber composition 5 is wrapped around the assembled plies. The total thickness of the layer of rubber composition is in the order of ⅜ of an inch, and it may be applied, preferably by the application of thin sheets of unvulcanized compounded rubber, until the proper total thickness is obtained. The composition of the rubber is such that after vulcanization the material should be relatively soft or at least provide a composition which does not exceed a durometer reading of 30.

Upon the application of the rubber sheet of the desired thickness, the entire assembly is subjected to a vulcanizing operation which bonds the rubber composition and the plies in an integral assembly. After vulcanization the assembly is removed from the mandrel 1. This is accomplished by cutting the assembly longitudinally with a knife along the line 6, as indicated in Fig. 2. The knife is pressed firmly through the rubber composition 5 and through the fabric layer 3, while the metal strip 4 prevents the marginal portion of the ply 2 from becoming severed from the remaining portion of the ply.

Figure 3:
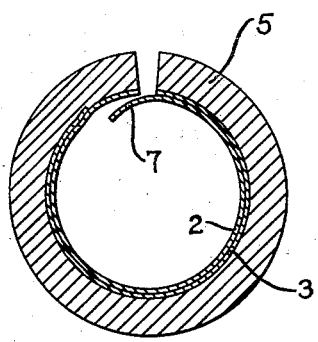
Fig. 3 is a transverse view, in section, of puncture sealing material in its relaxed state.
Figure 4:
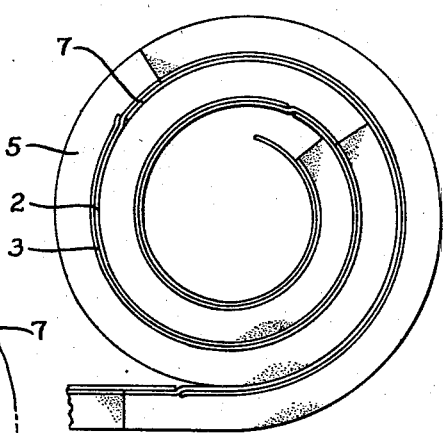
Fig. 4 is an end elevational view illustrating the manner in which units of puncture sealing material may be joined together to form larger sheets of the material to facilitate its application to larger surfaces.

In assembling the component parts on the mandrel, a suitable marking may be formed on the mandrel to indicate the longitudinal point where the cut 6 should be made. An effective marking for this purpose may be provided by allowing the metal strip 4 to extend beyond the ends of the assembled sealing material. After the assembly has been cut along the line 6, the entire unit is stripped from the mandrel 1, resulting in the formation of a combination unit such as illustrated in Fig. 3. The unit as here illustrated is in substantially circular formation in cross section, and in this state does not embody compression strains in the rubber. It is also noted in this view that the fabric ply 2 includes a free marginal portion 7 extending longitudinally of the assembly. At the opposite end of the fabric reinforcement a portion of the reinforcement consists of a single layer only of the fabric, in order to provide a balanced construction when two or more of the units are joined together. Because the sealing units are originally formed on a mandrel having a relatively small diameter, the resulting circumferential length of the unit is relatively small. To form large sheets from these units, the overlapping layer 7 is cemented to the fabric layer of a preceding similar unit and the abutting edges of the rubber composition 5 may also be cemented. Such a combination of units is shown in Fig. 4, in which the sections so joined may take the form of relatively large rolls. From a roll of this material a tank may be lined.

Figure 1:
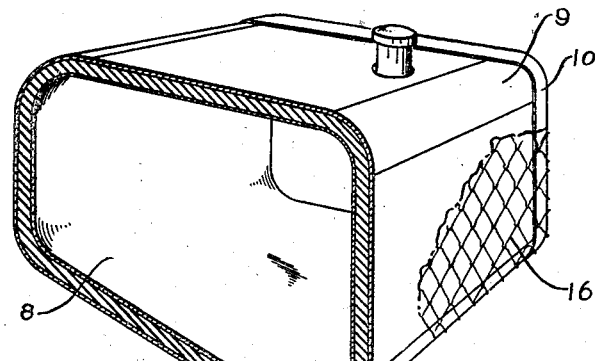
Fig. 1 is a perspective view, in section, of a tank embodying puncture sealing sheeting.

In Fig. 1 is shown a conventional tank 8 such as is ordinarily employed as a container for gasoline or like materials. In this example, the sealing material is applied to the outer surface of the tank with the rubber surface lying adjacent to the tank wall. As the material for sealing is flattened out against a plane wall surface, the fabric reinforcement being substantially inextensible causes the rubber composition to incur compression stresses. The sealing material may be united to the wall of the tank by a cementing operation involving a cold cure. The compression stresses in the rubber composition are, therefore, permanently maintained therein. While the sealing material, as above stated, may be cemented to the wall of the tank, it is to be understood that any means for holding the sealing material at or in close proximity to the tank wall will be sufficient to accomplish the purpose of the sealing material by preventing any substantial leaking or loss of fluid from within the tank. For example, fabric or wire mesh 16 may be applied over the sealing material.

As shown in the assembly in Fig 1, reinforcing strips of rubberized fabric 9 and 10 may be added to increase the rigidity of the assembly at the corner regions. If the sealing material is not fastened securely to the wall of the tank, it is recognized that any leakage caused by a puncture through the wall of the tank may cause the fluid to seep between the sealing material and the wall of the tank. Such a condition is not objectionable because the sealing material itself will retain any substantial loss of the fluid. Furthermore, the sealing material as herein provided is intended to function as a temporary or emergency means for safeguarding the contents of the tank. It is also to be understood that in the event the contents within the tank are of the nature of gasoline and a leak occurs, the result will be a swelling of the rubber composition. Such a condition is not detrimental in the present case because as the rubber swells it thereby increases the compression stresses in the rubber and improves the quality of the sealing material against loss of the fluid. In place of a rubber composition, other materials may be used which are not affected by the action of gasoline. Such materials comprise neoprene or other artificial rubber compositions.

Figure 5:
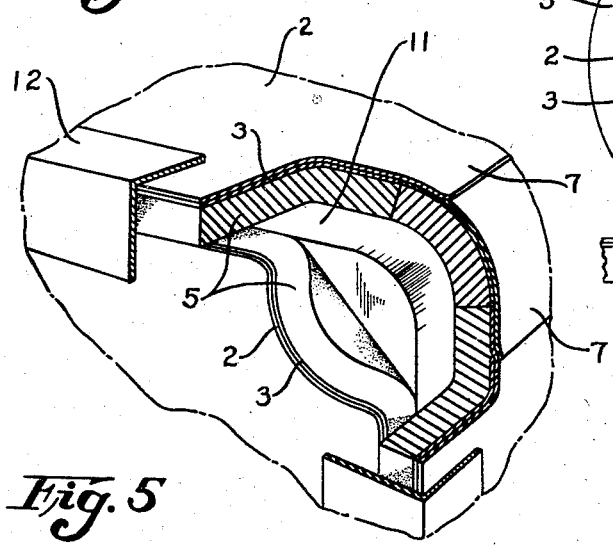
Fig. 5 is a perspective view, partly in section, illustrating a detailed construction of a method of attaching puncture sealing material to the corner portions of a tank; and, Fig. 6 is a transverse view, in section, of a portion of a container illustrating a modified form of my invention.

Fig. 5 shows a detail construction of a method of covering the corner portion of a tank 11. In this construction it will be noted that all of the joints and abutting edges or surfaces of the sealing material are cemented together to form, in effect, a hermetically sealed container exclusive of the tank. Rubberized fabric strips 12 may be employed for the purpose of further reinforcing the corner portions of the tank.

Figure 6:
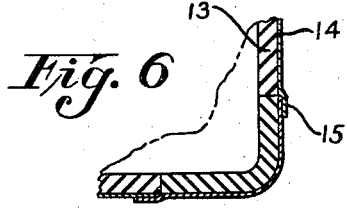

While I have shown a reinforcing material in the form of a rubberized fabric for the purpose of functioning as an inextensible support for the body of rubber composition, it is to be understood that other materials besides fabric may be employed. For example, a light weight sheet metal may be utilized in bonded relationship with the rubber composition. A sealing material which embodies a metal sheet as an inextensible support for the rubber composition may serve with the rubber composition as the entire wall of a tank. Such a construction is shown in Fig. 6, in which the sealing material 13, upon being straightened out, incurs compression stresses, and these stresses are maintained by the sheet metal backing 14 which is of sufficient strength to maintain the assembly in a flat plane. Overlapping portions of the metal 15 may be united to adjacent similar units by a soldering operation.

For a container of this type, in which the rubber composition 13 is exposed at the inner surface of the tank, it is preferable to employ a rubber or rubber-like composition which is inert to oil and gasoline such as the composition sold under the trade name neoprene, said to be a polychloroprene made by polymerizing 2-chlorobutadiene 1:3.

While I have shown and described a preferred method of practicing my invention, it is to be understood that it may be otherwise practiced as appearing within the scope of the appended claims.

Having thus described my invention, what I claim and desire to protect by Letters Patent is:

1. The method of making a flat wall having the inherent characteristic of automatically closing a puncture made therein, which consists in forming an elongated tube of substantially inextensible flexible sheet material, vulcanizing a relatively thick layer of soft rubber composition to the outside of the first mentioned tube to form a tube of soft rubber having an external circumference materially greater than the internal circumference, slitting the tubes lengthwise and straightening the first tube into a flat sheet to hold the material of the second tube in the form of a flat sheet having opposite faces of substantially equal width and having internal compressive stresses.

2. The method of making a flat wall having the inherent characteristics of automatically closing a puncture made therein which consists in forming a plurality of layers of substantially inextensible, flexible sheet material into a multiple-ply tube, applying a relatively thick layer of soft rubber composition to the outside of the first mentioned tube to form a tube of soft rubber having an external circumference materially greater than the internal circumference, vulcanizing the sheet material and soft rubber to form an integral tube while maintaining the layers of inextensible material separate throughout a strip along the length of the tube, slitting the soft rubber and one only of the plies along the length of the tube and straightening the inextensible sheet material into a flat sheet having a flat body of rubber under internal compressive stresses and having a lip of inextensible flexible material projecting therefrom.

3. The method of making a flat wall having the inherent characteristics of automatically closing a puncture made therein which consists in winding a single sheet of inextensible material into a tube having a plurality of layers, the opposite edges of the sheet material being disposed substantially in the same radial plane of the tube, applying a relatively thick layer of soft rubber composition to the outside of the tube to form a tube of soft rubber having an external circumference materially greater than the internal circumference, vulcanizing the soft rubber composition and the inextensible sheet material and vulcanizing the layers of sheet material together except in a strip adjacent the edges of the sheet, said layers being kept separate throughout this strip, slitting the layer of soft rubber and the outermost layer only of the inextensible sheet material, and straightening the resulting structure to form a flat wall having a sheet of relatively soft rubber under internal compressive stresses and having a projecting lip along one edge.

ERNST EGER.